(12) United States Patent
Cieslinski

(10) Patent No.: US 7,753,528 B1
(45) Date of Patent: Jul. 13, 2010

(54) FILM TRANSPORT DEVICE

(75) Inventor: Michael Cieslinski, Unterhaching (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 874 days.

(21) Appl. No.: 11/613,519

(22) Filed: Dec. 20, 2006

(30) Foreign Application Priority Data

Dec. 23, 2005 (DE) .................. 10 2005 061 993

(51) Int. Cl.
*B65H 23/04* (2006.01)
*G03B 1/22* (2006.01)

(52) U.S. Cl. .................. 352/166; 352/191; 226/2; 226/57

(58) Field of Classification Search .......... 352/166, 352/187–190, 183, 184; 226/2, 55, 57
See application file for complete search history.

(56) References Cited

U.S. PATENT DOCUMENTS

| 5,188,270 A | | 2/1993 | Hiramatsu et al. |
| 5,328,073 A | * | 7/1994 | Blanding et al. ............... 226/27 |
| 5,423,467 A | * | 6/1995 | Blanding ..................... 226/3 |
| 5,529,232 A | * | 6/1996 | Blanding ..................... 226/58 |
| 5,866,772 A | * | 2/1999 | Moots ........................ 800/260 |
| 2003/0193556 A1 | | 10/2003 | Druzynski et al. |

FOREIGN PATENT DOCUMENTS

| CH | 405861 | 7/1966 |
| DE | 368260 | 2/1923 |
| DE | 1472630 | 1/1969 |
| DE | 10156846 | 6/2002 |
| EP | 0 576 371 | 12/1993 |
| EP | 0849931 | 6/1998 |
| GB | 669639 | 4/1952 |
| JP | 03129353 | 6/1991 |
| WO | WO-96/19751 | 12/1995 |

* cited by examiner

*Primary Examiner*—William C Dowling
(74) *Attorney, Agent, or Firm*—Gifford, Krass, Sprinkle, Anderson & Citkowski, P.C.

(57) ABSTRACT

The invention relates to a film transport device for transporting a motion picture film, in particular in a film recorder, having a rotatable transport drum for the rotary guidance of the film. The transport drum has movable registration pins which can be introduced temporarily into the transport path of the film at the transport drum to precisely fix the position of the film. The invention furthermore relates to a film recorder having a film transport device of the mentioned kind and to a method of transporting a motion picture film by means of a rotating transport drum, in particular in a film recorder.

19 Claims, 4 Drawing Sheets

FILM TRANSPORT DEVICE

CROSS-REFERENCE TO RELATED APPLICATIONS

This application claims the benefit of German Patent Application No. 10 2005 061 993.2, which was filed on Dec. 23, 2005. The disclosure of the above application is incorporated herein by reference.

FIELD OF THE INVENTION

The invention relates to a film transport device for the transporting of a motion picture film, in particular for use in a film recorder.

BACKGROUND OF THE INVENTION

The statements in this section merely provide background information related to the present disclosure and may not constitute prior art.

A film recorder is normally used to record digitally processed image data on photographic film material in order ultimately to be able to show the motion picture film or a copy prepared from it in the cinema. It is important in this connection that the image position of sequential individual images remains as constant as possible since otherwise the perceived image moves on projection in the cinema. It is also particularly important with a film recorder of this type that a constant spacing is maintained between exposed picture elements adjacent to one another; otherwise, perceivable differences in intensity can arise in the exposed image which make themselves noticeable as a stripe pattern, for example in an image exposure taking place line by line. Perforation holes, which are formed at one or both longitudinal sides of the film, are used for the positioning of the film. The image position perceived in the cinema is therefore the position of the image relative to the position of the perforation holes. To ensure a good relative image position, registration pins are usually introduced into the perforation holes and the film is positioned thereby.

It is generally possible to distinguish between film recorders which expose an image while the film is stationary and those which write the image line for line while the film is being moved. In the latter types, in particular laser film recorders, the film is fixed in a film holder on a linear guide, for example using registration pins. After the introduction of the registration pins into the perforation holes, the linear guide accelerates to the correct speed for the exposure of an image. The exposure then takes place line by line at a constant speed of the linear guide. Subsequently, the linear guide is braked again, the registration pins are removed from the positioning holes and the linear guide is moved back to the starting position. A high image position precision, however with a low throughput (expose images per time unit) is achieved by this design principle (linear guide with pin registration), since no images are exposed during the steps of accelerating, braking and moving back the linear guide.

SUMMARY OF THE INVENTION

It is the underlying object of the invention to provide a film transport device which ensures a precise fixing of a position of a film and simultaneously permits a high throughput, for example in a film recorder, by an efficient film transport.

This object is satisfied by a film transport device having a rotatable transport drum that has movable registration pins, which can be introduced temporarily into the transport path at the transport drum to precisely fix the position of the film.

The film transport device in accordance with the invention therefore has a transport drum which is rotatably supported. The transport drum has drivable registration pins which can be disengaged from the jacket surface of the transport drum or can be retracted into it at times. The registration pins are moved out for the transport of the film and engage into the transport path of the film track. Expediently, the registration pins are introduced into perforation holes which are arranged at one or both longitudinal sides of the film. The film can thus be drawn by a rotation of the transport drum and can hereby be transported.

It is ensured by the registration pins temporarily introduced into the perforation holes that the film is correctly positioned on the surface of the transport drum, in particular in a direction tangential with respect to the rotary movement of the transport drum. It is ensured, in other words, that the longitudinal section of the film contacting the transport drum practically does not carry out any relative movement with respect to the drum. Image position errors can thus be reliably avoided.

Transport drums for film transport are admittedly generally known, for example in connection with film scanners which scan the image line by line (telecine). Drums of this type are, however, provided with fixed teeth which dip into the perforation holes of the film. With these known transport drums, the film positioning is substantially more imprecise since the film slips over the flanks of the teeth when the teeth dip into the perforation holes and thus moves slightly relative to the transport drum. The invention is based on the recognition that this slight relative movement already carries the risk that the line spacing of individually exposed lines is not maintained precisely enough and adjacent lines can thereby overlap in part on the exposure, which can result in the already explained stripy images in projection.

The use of a film transport device of this type is accordingly particularly advantageous in a film recorder since particularly high demands are made on the precision of the image position here. Since the film can no longer move on the transport drum, the precision of the image position thus only depends on the precision of the drum movement and is therefore as comparably high as in the design principle of a linear guide with pin registration. However, an improved exposure throughput can be achieved with respect to this, in particular when the transport means is rotated continuously.

In accordance with a preferred embodiment, the registration pins are movable perpendicular to the jacket surface of the transport drum, i.e. in a radial direction. The registration pins can hereby be introduced in a fast and gentle manner into the film track and the film secured against slipping.

It is furthermore preferred for there to be associated with each registration pin a further registration pin, with these registration pins being arranged such that they can be introduced into the perforation holes at the two longitudinal sides of the film in pairs. The registration pins of such a pin pair are movable synchronously toward one another, i.e. they can, for example, be introduced into or retracted from the perforation holes of the film simultaneously at both sides. This has the consequence of an improved guidance and positioning of the film on the jacket surface of the transport drum.

In accordance with an advantageous further development of the invention, the registration pins are divided into a plurality of groups. The registration pins of the different groups can be disengaged from the jacket surface of the transport drum at different times and thus engage into the transport path of the film, for example offset to one another in time or alternately. A group-wise division of the registration pins of this type simplifies the drive system required for the driving and mutual synchronization of the registration pins. For this purpose, it is also preferred for the registration pins of a group to be able to be disengaged from or retracted into the jacket surface of the transport drum simultaneously.

Furthermore, provision can be made in the named further development for the registration pins of a group to be mechanically coupled. It is thus ensured in a simple manner that the registration pins of a group can be disengaged or retracted at fixedly defined times.

In accordance with a particularly preferred embodiment, the film transport device includes a control device which ensures that the registration pins are introduced at a time at which no exposure of the film takes place. In other words, the time for the introduction of the registration pins is chosen such that any possible offset of the film relative to the transport drum associated therewith does not have any influence on the quality of the exposed images. An exposure break between the exposure of two sequential individual images predetermined by the film format is therefore advantageously utilized to position and fix the film exactly on the transport drum.

It is furthermore preferred for the registration pins to be actuated using a device which is driven coaxially to the axis of rotation of the transport drum. An arrangement of the actuation device of this type represents a particularly simple and reliable type of construction. Provision can in particular be made for the registration pins to be moved by means of an actuation bar which is arranged coaxially to the axis of rotation of the transport drum.

The registration pins are connected to the associated actuation device, preferably via levers and joints. This can be realized simply mechanically, but nevertheless permits a precise control of the registration pins.

In accordance with a further preferred embodiment, a fixing device is provided which additionally fixes the film on a part of the jacket surface of the transport roll, in particular by a force effect substantially radial with respect to the axis of rotation of the transport drum.

An advantageous embodiment of a fixing device of this type includes pressure belts which press the film onto the transport drum in the marginal area outside the individual images. These pressure belts are preferably guided peripherally and additionally secure the film against slipping by the pressure exerted onto the film.

Alternatively or additionally, the film is sucked onto the transport drum by vacuum. For this purpose, the jacket surface of the transport drum is provided with bores which are in communication with the inner space of the transport drum. The vacuum is also provided or generated in the inner space of the transport drum.

The named devices for the additional fixing of the film result in a further improvement of the image position precision of the film transport device. A possibly incomplete areal lying of the film on the transport drum is also additionally thereby countered. Above all, the film can hereby be guided to the transport drum via loose loops, whereby the transport drum remains free of external forces.

In accordance with a further preferred embodiment of the invention, the transport of the film takes place continuously, i.e. the transport drum is drive to make a continuous rotary movement by a rotary drive device. A design of the drive of this type substantially increases the throughput of a film recorder, for example, since a constant advance is ensured during the whole process in contrast to the design principle of the linear guide with pin registration.

The invention furthermore relates to a film recorder having a film transport device in accordance with one of the described embodiments. Such a film recorder delivers a high throughput with a simultaneously high image position quality.

In a particularly preferred embodiment of a film recorder of this type, the film is exposed on the transport drum. In other words, the exposure takes place, in particular with a laser beam, in a region of the film which lies on the transport drum and is fixed by the registration pins. The required precision of the image position is thereby ensured. A film recorder of this type thus combines the advantages of a high image position precision by pin registration with a high throughput by the use of a transport drum with continuous drive.

The invention furthermore relates to a method for transporting a motion picture film by means of a rotating transport drum, in particular in a film recorder, with the transport drum having movable registration pins and with in each case at least one of the registration pins being introduced temporarily into a perforation hole of the film to precisely fix the position of the film.

This method is therefore characterized in that at least one of the registration pins is introduced into a perforation hole of the film at times. The correct positioning of the film on the transport drum is thereby ensured and the film is reliably secured against slipping, as was already explained in connection with the transport device in accordance with the invention.

In a particularly preferred embodiment of the method, the introduction of the registration pins into the perforation holes is controlled in time such that it takes place during a break between an exposure of two sequential individual images. The advantage of this embodiment lies in the minimization of the mechanical defects of the film during the exposure. The registration pins introduced into the perforation holes are therefore largely at rest relative to the transport drum during the exposure procedure.

In addition, in this method, the film can also be fixed to the drum particularly well in that a plurality of registration pins are simultaneously introduced into associated perforation holes of the film along the periphery of the transport drum.

It is furthermore preferred for the exposure of the film to take place on the transport drum, i.e. to take place when the film lies areally on the transport drum and is sufficiently precisely positioned.

Provision can furthermore be made for the film to be exposed in a region which, in the transport direction, lies behind the registration pin drawing and fixing the film. A high throughput of exposed images per time unit is achieved with a high positional precision of the individual images by this time sequence, i.e. introduction of the registration pins and drawing of the film up to the exposure position with subsequent exposure.

Further advantageous embodiments of the invention are set forth in the dependent claims, in the description and in the drawings.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The invention will be described in the following only by way of example with reference to the drawings.

DETAILED DESCRIPTION OF THE PREFERRED EMBODIMENTS

Figure 1:
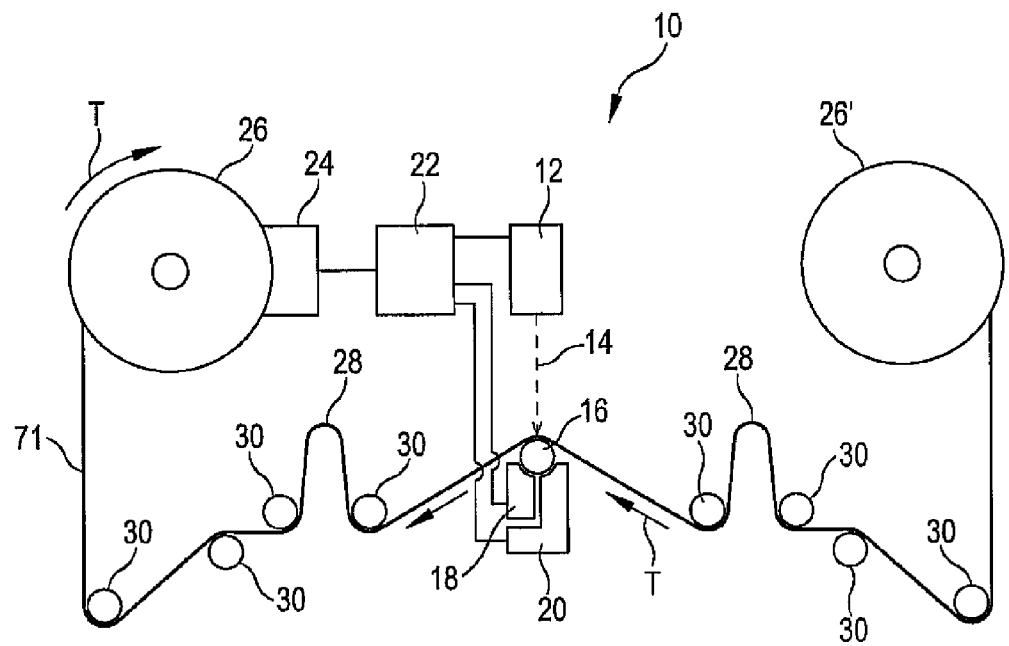
FIG. 1 shows a film recorder in a schematic side view.

The following description is merely exemplary in nature and is not intended to limit the present disclosure, application, or uses. It should be understood that throughout the drawings, corresponding reference numerals indicate like or corresponding parts and features.

FIG. 1 illustrates a possible use of a film transport device of the type explained. A film recorder 10 with a recording unit 12 is shown, with the recording unit 12 having a light source (not shown). The recording unit 12 can also include an optical system (not shown) which directs an exposing light beam 14 onto a motion picture film (also called a film in the following) 71 in a suitable manner. The optical system can also include optical elements forming the light beam. The film 71 is exposed in a region in which the film lies on a part of a transport drum 16. The recording of the film 71 can take place, for example, by three lasers having the primary colors red, green and blue.

The transport drum 16 is driven by a rotary drive device 18 to make a rotary movement. An actuation device 20 is moreover associated with the transport drum 16 and disengages the moving registration pins 34, 34' (not shown here) out of the jacket surface of the transport drum 16 or retracts them into it. An embodiment for the control of the registration pins 34, 34' will be described in more detail later with reference to FIGS. 3 and 4a to 4d. Both the recording unit 12 and the rotary drive device 18 and the actuation device 20 are connected to a control circuit 22. The control circuit 22 also has a connection to a winding reel drive 24.

The film 71 is guided between two winding reels 26 and 26' while forming two balance rings 28 along a plurality of guide pulleys 30. The winding reel 26 is driven by the winding reel drive 24. The film 71 is moved in a transport direction T by the action of the coil reel drive 24 and of the rotary drive device 18 of the transport drum 16.

As already mentioned, the exposure of the film 71 takes place on the transport drum 16. For this purpose, the film 71 is moved continuously by a rotary movement of the transport roll 16 generated by the rotary drive device 18 while the film is exposed by the light ray 14. This exposure is carried out line by line in the embodiment shown. The film 71 is fixed on the transport drum 16 by registration pins 34, 34' not shown here. The introduction of the registration pins 34, 34' into the film track takes place by means of the named actuation device 20. The control circuit 22 provides a synchronization of the coil reel drive 24 and of the rotary drive device 18 with the actuation device 20. In addition, the advance of the film 71 and the exposure by the recording unit 12 are synchronized by means of the control circuit 22. The exact coordination of the advance of the film with the exposure (or vice versa) is important for the quality of the recording. The correct position of the film on the transport drum has to be ensured at every time to be able to carry out a reliable exposure with high positional faithfulness. The synchronization is simplified and a high throughput is ensured by a constant and uniform transport of the film 71.

Figure 2:
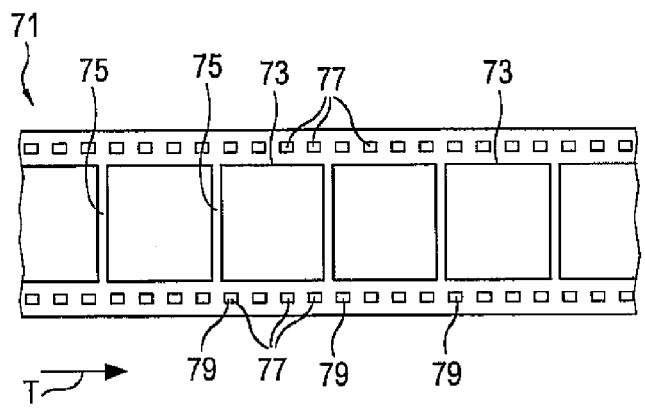
FIG. 2 shows a section of a motion picture film in a plan view.

FIG. 2 shows a section of a film 71 in a plan view. The film 71 has a plurality of image regions 73 along its longitudinal direction in an equidistant arrangement which each correspond to an individual image of the film which has been exposed or is to be exposed. Two adjacent image regions 73 are separated from one another by a respective separation region 75. A respective regular arrangement of perforation holes 77 is provided at the two longitudinal sides of the film 71.

In accordance with current standards, a reference perforation hole 79 is associated with each image region 73, with said reference perforation hole 79 being arranged at the height of the adjacent image region 73 in the film transport direction T. This standardization has the sense that a fixed relative position is defined between an image region 73 and a device which fixes the film 71 for the recording and subsequent playback of the film 71 with different devices. A constant image steadiness is thereby ensured such that no image shift occurs on the playback of the sequence of image regions 73.

The embodiment and the function of the already mentioned registration pins 34, 34' will be described in more detail in the following.

Figure 3:
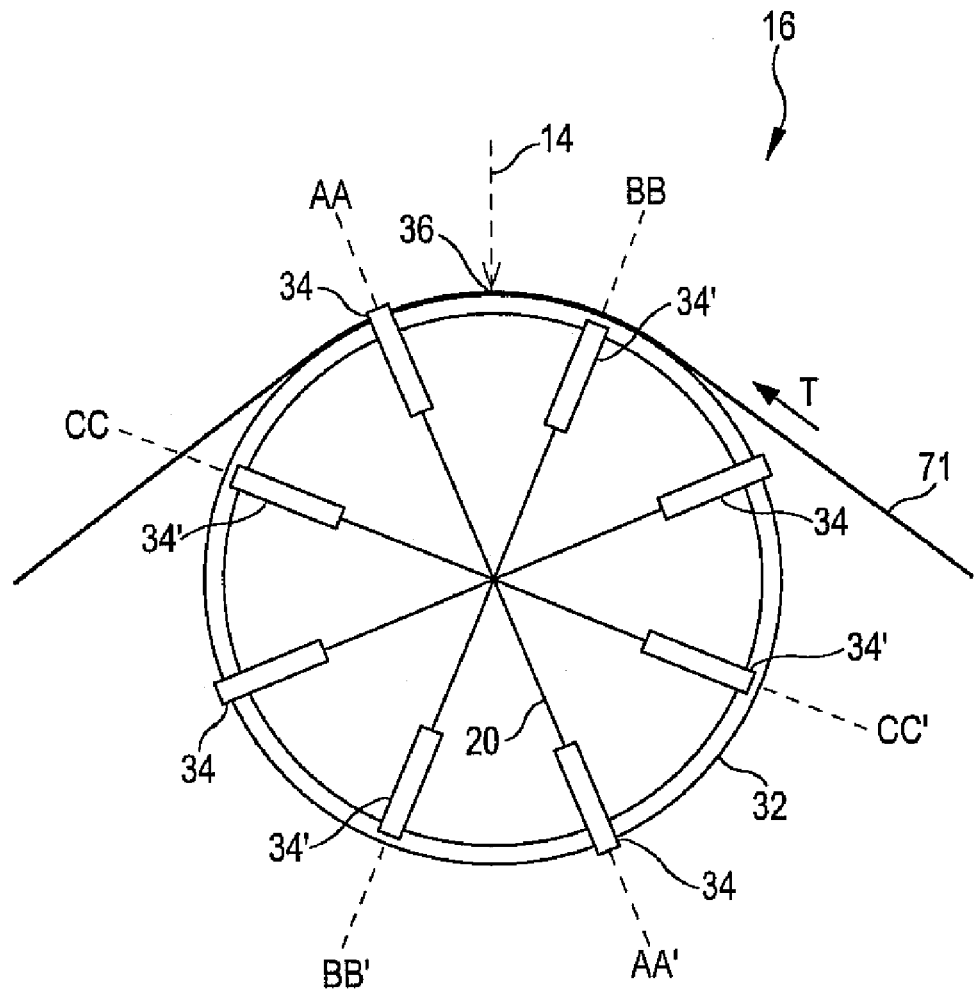
FIG. 3 shows a film transport drum in a schematic cross-sectional view parallel to the film transport direction.

In FIG. 3, a transport drum 16 is shown in a schematic cross-sectional view parallel to the film transport direction T. The film 71 is moved from right to left in the representation in accordance with FIG. 3. It lies on a jacket surface 32 of the transport drum 16 in a specific region (angular segment). The transport drum 16 has radially aligned and movable registration pins 34, 34'. In the state shown in FIG. 3, the registration pins 34 are disengaged from the drum jacket surface 32 while the registration pins 34' are retracted into them. In this embodiment, two groups of registration pins 34 and 34' respectively are therefore realized which are moved simultaneously—but in opposite senses to one another. The registration pins 34, 34' are connected for this purpose to the actuation device 20 which is only shown schematically here and is shown more precisely in FIGS. 4a to 4d. They show sectional views along the lines AA-AA', BB-BB' and CC-CC' in accordance with FIG. 3.

Only one of the disengaged registration pins 34 (or one pin pair, cf. the following) temporarily serves for the fixing of the film 71 to the transport drum 16 and thus for the transfer of a tangential pulling force from the transport drum 16 to the film 71. The registration pins 34, 34' are provided in such a division that the peripheral section of the drum jacket surface 32 between two adjacent registration pins 34 and 34' (or 34' and 34) corresponds precisely to the periodicity of the longitudinal arrangement of the image regions 73 of the film 71 to be exposed (FIG. 2). In other words, the sequential registration pins 34, 34', 34, etc. engage sequentially into each fourth perforation hole 77 of the film 71 shown in FIG. 2, namely only into the reference perforation holes 79.

It is thus ensured by the registration pin 34 instantaneously engaging into the film track (FIG. 3) that the film 71 is correctly positioned and reliably fixed on the drum jacket surface 32 during an exposure. On the further continuing rotation of the transport drum 16, an image region of the film 71 just exposed releases from the drum jacket surface 32 again and the respective registration pin 34 is retracted back into the drum jacket surface 32 while the next registration pin 34' is simultaneously disengaged. The registration pins 34, 34' are therefore only introduced into the perforation holes 77 of the film 71 at times.

In the operation of the film transport device, while the rotary drive device 18 drives the transport drum 16 to make a continuous rotary movement at a constant angular speed, the film 71 is guided from the bottom right in the representation in accordance with FIG. 3, initially upwardly via the transport drum 16 and finally to the bottom left. A force component acting radially in the direction of the axis of rotation of the transport drum 16 is caused by this type of guidance in the apex of the film movement. The film 71 is thereby pressed onto the drum jacket surface 32 and thus always lies on the surface of the transport drum 16 in an areal manner. An incomplete lying on and irregularities of the image regions 73 associated therefore which can, for example, result from a longitudinal arching of the film 71 (so-called curl) and which could cause unwanted imaging errors during exposure are therefore hereby effectively avoided.

It must be noted that the registration pin 34 is disengaged from the drum jacket surface 32 at the upper point of intersection of the line AA-AA' with the drum jacket surface 32. The film 71 is exposed line by line by the light ray 14 at an exposure position 36 offset against the direction of transport T with respect to this point of intersection, while the film 71 is pulled by the named disengaged registration pin 34.

Only subsequently to the recording of an image region 73 is the next registration pin 34 or 34' introduced into a perforation hole 77, in particular into a reference perforation hole 79. The introduction of the pin takes place in an exposure break between the exposure of the respective two image regions 73. In other words, a registration pin 34 or 34' is introduced into a perforation hole 77 (in particular reference perforation hole 79) when the dividing region 75 is located between two image regions 73 (FIG. 2) at the exposure position 36 (FIG. 3). The recording unit 12 can be inactive when the dividing region 73 runs through the exposure position 36 by a suitable synchronization.

With a time coordination of the introduction of the registration pins 34, 34' with the exposure procedure of this type, any slipping of the film 71 due to the introduction of the registration pins 34, 34' has no influence, or at most a negligible influence, on the image quality, since the film 71 is not exposed during this time, as already explained. After the introduction procedure—that is during the exposure—the registration pins 34, 34' are at rest relative to the drum jacket surface 32.

It must still be pointed out that admittedly in each case only one of the registration pins 34, which is introduced into the film track, can be seen in the sectional view in accordance with FIG. 3. However, there is associated with each registration pin 34, 34' a further registration pin which is offset parallel to the axis of rotation of the transport drum 16 so that a pin always engages at both longitudinal sides of the film 71. These two registration pins 34 and 34' together form a mechanically coupled pin pair. This can also be seen from FIG. 5.

It must furthermore still be pointed out that at least the film-guiding regions of the drum jacket surface 32 can be made light absorbing. Since the total exposing light is not absorbed by the film 71, a certain amount of this light passes through the film track. A reflection of this light at the drum jacket surface 32 can result in parasitic exposure effects (e.g. halos) which are to be avoided where possible. For this purpose, the drum jacket surface 32 can be made light absorbing (e.g. by blackening, sintering or another surface treatment) or can be provided with light absorbing material. Alternatively, the light can be directed away from the outer surface of the drum jacket surface 32 into the interior of the transport drum 16 by fine bores in the drum jacket surface 32.

To make the function of an embodiment of the already named actuation device 20 clear, FIGS. 4a to 4d will be described more precisely in the following.

Figure 4A:
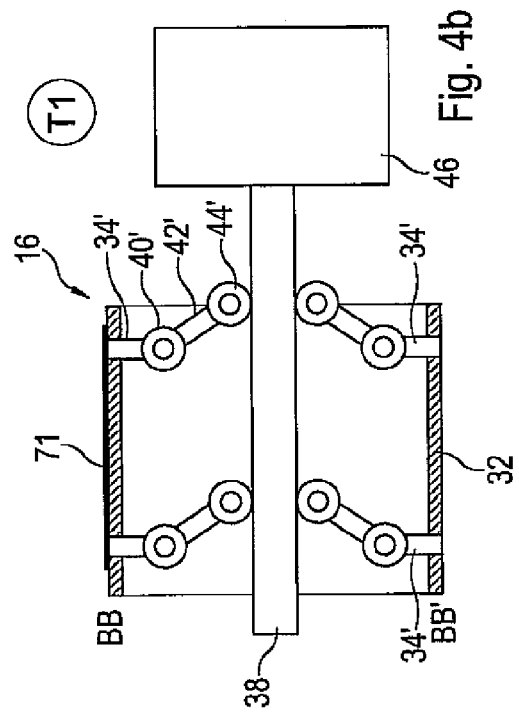
FIGS. 4a and 4b show a film transport drum in a schematic cross-sectional view along the plane AA-AA' or along the plane BB-BB' in accordance with FIG. 3.

FIG. 4a shows a cross-sectional view of the transport drum 16 perpendicular to the film transport direction along the line AA-AA' (see FIG. 3) at a time T1. The registration pins 34 are disengaged at this time and project out of the drum jacket surface 32. The registration pins 34, 34' are coupled with an actuation bar 38, and indeed via registration pin joints 40, connection elements 42 and connection element joints 44. The actuation bar 38 is arranged coaxially to the axis of rotation of the transport drum 16. It can be moved forward and backward by a linear drive 46 in a direction parallel to the drum jacket surface 32.

Figure 4C:
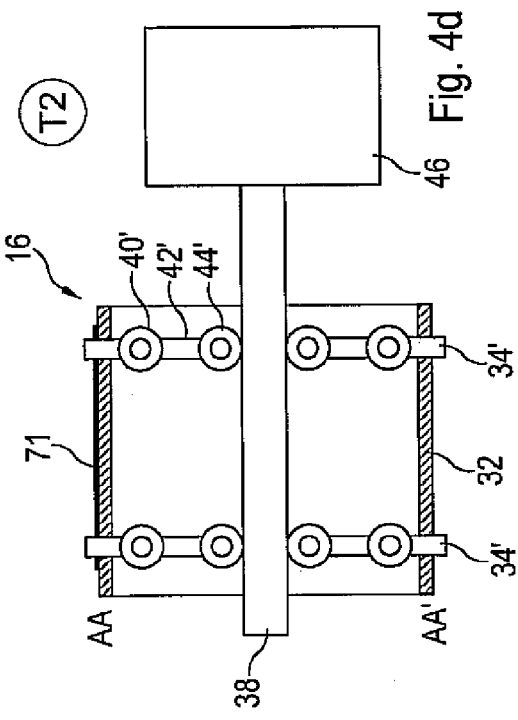
FIGS. 4c and 4d show a transport drum in a schematic cross-section along the plane CC-CC' or along the plane AA-AA' in accordance with FIG. 3, that is after a further movement of the transport drum with respect to FIGS. 4a and b by an eighth of a turn.
Figure 4B:
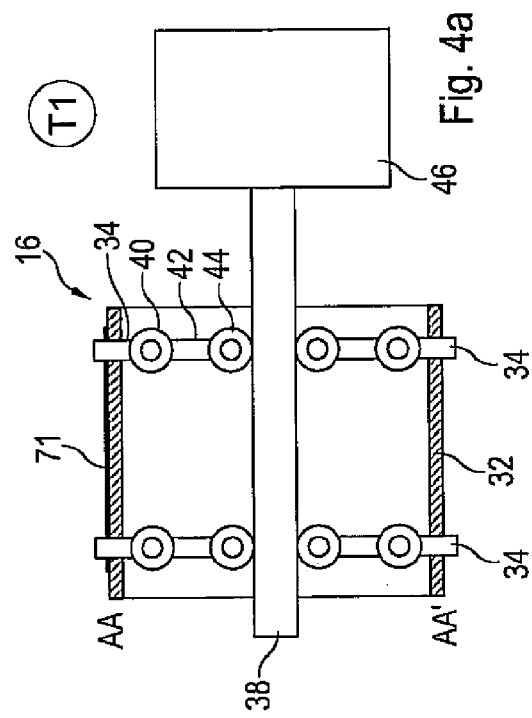

In FIG. 4b, a cross-sectional view of the transport drum 16 along the line BB-BB' (FIG. 3) is shown at the same time T1. The registration pins 34' are in a position retracted into the drum jacket surface 32. It must be noted that the connection elements 42' each associated with the registration pins 34' are hinged to the actuation bar 38 at a different longitudinal section than the connection elements 42 in accordance with FIG. 4a. While the connection elements 42 are aligned perpendicular to the actuation bar 38 at the time T1, the connection elements 42' extend obliquely to the actuation bar 38.

FIG. 4c shows the same components as in FIG. 4a, but at a later time T2. The transport drum 16 has been turned further by an eighth of a full revolution at this time. The sectional plane in accordance with FIG. 4a defined by the line AA-AA' is now located parallel to the line CC-CC' (cf. FIG. 3). The registration pins 34 still projecting from the drum jacket surface 32 in FIG. 4a are now retracted into the drum jacket surface 32. The registration pins 34 have now been retracted radially into the transport drum 16 by means of the registration pin joints 40, the connection elements 42 and the connection element joints 44 by an axial movement of the actuation bar 38 which has taken place in the meantime—it must be noted that the actuation bar 38 projects further out of the transport drum 16 at the left side than in FIG. 4a.

Figure 4D:
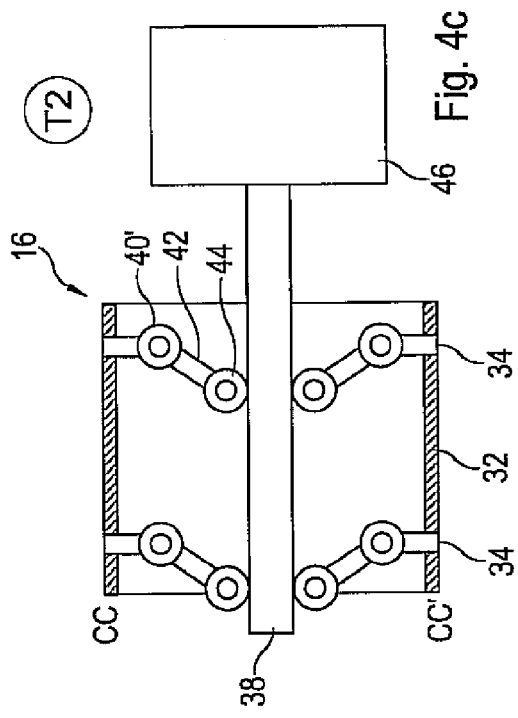

Analogously, FIG. 4d represents the components from FIG. 4b at the time T2. Due to the explained axial movement of the actuation bar 38, the registration pins 34' now project out of the drum jacket surface 32 and fix the film 71 on a part of the drum jacket surface 32 against slipping or—by engagement into the film track—permit the latter's transport. The connection elements 42' are now aligned perpendicular to the actuation bar 38.

The linear drive 46 for the actuation bar 38 shown in FIGS. 4a to 4d can be realized in different alternative manners and can in particular also be integrated into the transport drum 16. The drive of the actuation bar 38 can take place by a moving coil drive, for example. A further possibility is the use of a moving magnet motor in which a magnet is connected to the actuation bar 38. In this connection, the actuation bar 38 is moved by an interaction of a magnetic field generated by a coil with the magnet. The coil can then be arranged outside the transport drum 16. Since this drive is not co-rotating, collector rings for the power supply of the motor are dispensed with.

Instead of the use of an actuation bar 38, the registration pins 34, 34' can, for example, be arranged in a biased position so that they are retracted into the drum jacket surface 32 without the effect of additional forces. The registration pins 34, 34' can then be introduced into the transport path of the film along the transport drum 16 at times by a suitably designed cam guide (not shown in the Figures).

Figure 5:
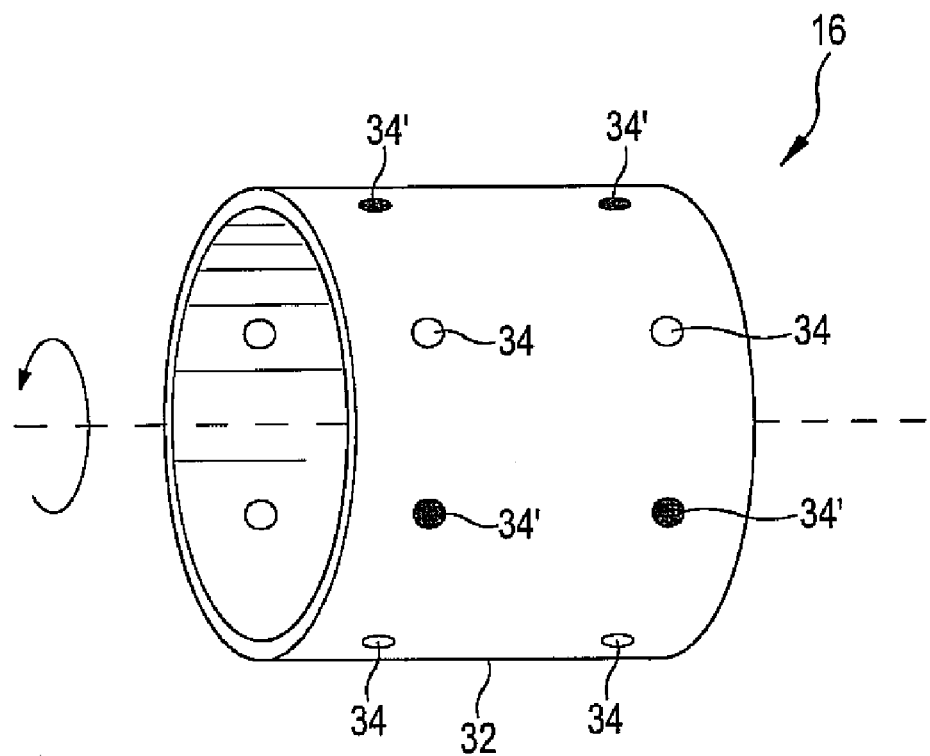
FIG. 5 shows a perspective view of a transport drum.

FIG. 5 shows a perspective view of the transport drive 16. The broken line represents the axis of rotation of the transport drive 16. The arrangement of the registration pins 34, 34' at both sides, which allows an introduction of the registration pins 34 and 34' into the perforation holes 77 at the two longitudinal sides of the film 71, must be especially emphasized. Two oppositely disposed registration pins 34, 34' at the outer sides of the transport drum 16 form a pin pair, with the pins of a pair expediently being introduced synchronously into the film track.

Figure 6:
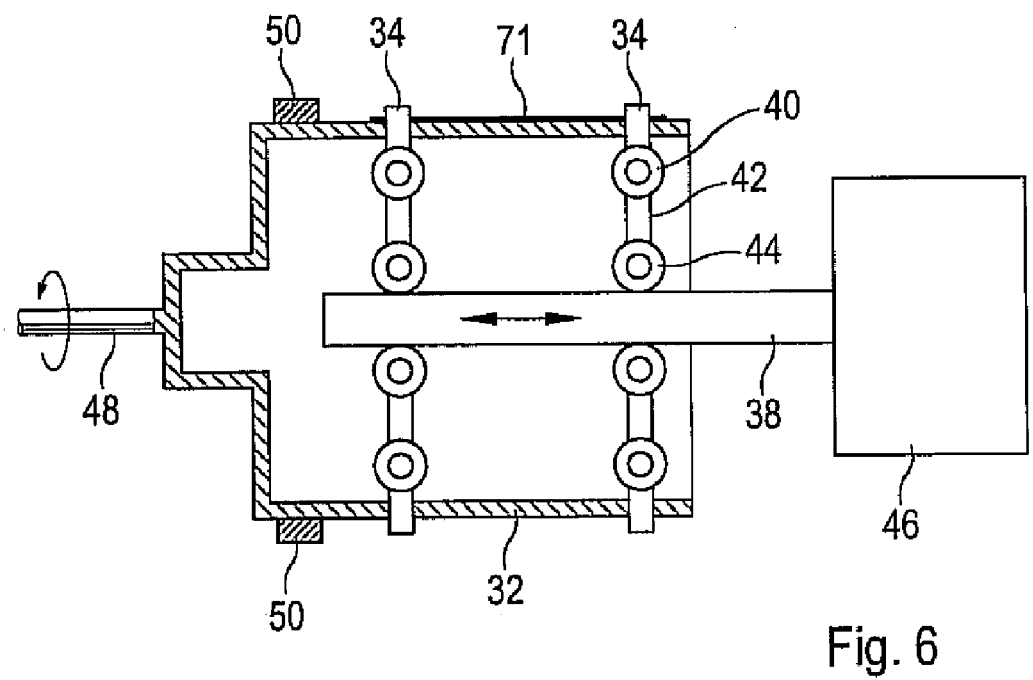
FIG. 6 shows a film transport drum in a schematic cross-sectional view perpendicular to the film transport direction with an embodiment of the rotary drive device of the transport drum.

In FIG. 6, the transmission path of a rotary movement from the associated rotary drive device 18 (cf. FIG. 1) to the transport drum 16 is shown in the left hand half. A drum axle 48 formed at one side serves as the drive shaft of a motor (not shown). Different drive possibilities are, however, also feasible. The drum can thus also be driven via a belt 50.

The description is merely exemplary in nature and, thus, variations that do not depart from the gist of the present disclosure are intended to be within the scope of the invention. Such variations are not to be regarded as a departure from the spirit and scope of the present disclosure.

The invention claimed is:

1. A film transport device for transporting a motion picture film (71), in particular in a film recorder, comprising:
    a rotatable transport drum (16) for the rotary guidance of the film, wherein the transport drum (16) has movable registration pins (34, 34'), which can be temporarily introduced into the transport path of the film (71) at the transport drum to precisely fix the position of the film; and
    a control device (22), by which the registration pins (34, 34') can be controlled such that the introduction of the registration pins into the transport path of the film takes place during an exposure break between a respective exposure of two sequential individual images (73) of the motion picture film.

2. A film transport device in accordance with claim 1, wherein the registration pins (34, 34') are movable in a radial direction with respect to the axis of rotation of the transport drum (16).

3. A film transport device in accordance with claim 1, wherein with each registration pin (34 or 34') there is associated a further registration pin (34 or 34') offset parallel to the axis of rotation of the transport drum (16) to form a pin pair, with at least the two registration pins of a pin pair being movable synchronously to one another.

4. A film transport device in accordance with claim 1, wherein the registration pins (34 or 34') are divided into a plurality of groups, with the registration pins of the different groups being able to be introduced into the transport path of the film at different times.

5. A film transport device in accordance with claim 4, wherein the registration pins (34 or 34') of a group can be driven simultaneously.

6. A film transport device in accordance with claim 4, wherein the registration pins (34 or 34') of a group are mechanically coupled for a movement synchronous with one another.

7. A film transport device in accordance with claim 1, wherein the registration pins (34, 34') are coupled to an actuation device (20), which can be driven coaxially to the axis of rotation of the transport drum (16).

8. A film transport device in accordance with claim 7, wherein the registration pins (34, 34') are coupled in an articulated manner to the actuation device (20) via levers.

9. A film transport device in accordance with claim 7, wherein the actuation device (20) has an actuation bar (38), which is arranged coaxially to the axis of rotation of the transport drum (16).

10. A film transport device in accordance with claim 1, further comprising a fixing device, which fixes the film to the transport drum in a radial direction with respect to the axis of rotation of the transport drum (16).

11. A film transport device in accordance with claim 10, wherein the fixing device has two pressure belts guided peripherally which each contact a longitudinal side of the film lying on the transport drum (16).

12. A film transport device in accordance with claim 10, wherein the fixing device is made for the provision of a vacuum in the inner space of the transport drum (16), with a plurality of bores being provided along the jacket surface of the transport drum to suck on the film.

13. A film transport device in accordance with claim 1, further comprising a rotary drive device (18), by which the transport drum (16) can be driven to make a continuous rotary movement.

14. A film transport device in accordance with claim 1, wherein a film-guiding surface of the transport drum (16) is made light-absorbing.

15. A film recorder for the exposure of a motion picture film (71) comprising a film transport device in accordance with claim 1.

16. A film recorder in accordance with claim 15, further comprising a recording device, by which a region of the film lying on the transport drum (16) can be acted on by light (14), in particular by a laser beam.

17. A method for transporting a motion picture film by means of a rotating transport drum, in particular in a film recorder, comprising:
    providing the transport drum (16) with movable registration pins (34, 34'); and
    temporarily introducing at least one of the registration pins (34, 34') into a perforation hole (77) of the film to precisely fix the position of the film, wherein the at least one of the registration pins (34, 34') is introduced into the perforation holes (77) during an exposure break between a respective exposure of two sequential individual images (73) of the film.

18. A method in accordance with claim 17, wherein the film is acted on by light (14), in particular by laser radiation, while the film (71) is lying on the transport drum (16) and is precisely fixed in position by the at least one of the registration pins (34, 34').

19. A method in accordance with claim 18, wherein a region of the film is acted on by light (14), which precisely fixes the position of the film instantaneously with respect to the at least one of the registration pins (34, 34') and is arranged offset against the direction of rotation of the transport drum (16).

* * * * *